United States Patent [19]

Puskadi

[11] 4,424,244
[45] Jan. 3, 1984

[54] PRINTABLE RELEASE COATING COMPOSITION TAPES

[75] Inventor: Frank Puskadi, Milltown, N.J.

[73] Assignee: Permacel, New Brunswick, N.J.

[21] Appl. No.: 307,399

[22] Filed: Oct. 1, 1981

[51] Int. Cl.³ .................... B32B 25/06; C08F 19/08; C09J 7/02

[52] U.S. Cl. .................................... 428/40; 428/195; 428/352; 428/354; 428/355; 428/483; 428/482; 428/458; 428/462; 428/518; 428/520; 428/513; 428/514; 428/906; 428/908; 428/918; 525/57

[58] Field of Search .............. 428/352, 354, 355, 195, 428/40, 483, 482

[56] References Cited

U.S. PATENT DOCUMENTS

| | | | |
|---|---|---|---|
| 2,816,655 | 12/1957 | Crozier | 206/59 |
| 2,913,355 | 11/1959 | Collins | 117/68.5 |
| 3,543,920 | 12/1970 | Crocker | 206/59 |
| 3,967,031 | 6/1976 | Lambert | 428/294 |
| 4,070,523 | 1/1978 | Blum et al. | 428/352 |
| 4,288,480 | 9/1981 | Grzywinski et al. | 428/352 X |

FOREIGN PATENT DOCUMENTS 921776  2/1973  Canada ................................ 117/27

Primary Examiner—P. Ives
Attorney, Agent, or Firm—Christie, Parker & Hale

[57] ABSTRACT

A printable release coating composition having a combination of properties of good release, good ink retention, good adhesion, good tack and no backsize splitting is prepared having three essential components; (1) vinylidene chloride-acrylonitrile copolymer, (2) a polymer selected from vinyl chloride-vinyl acetate-vinyl alcohol terpolymer, vinyl acetate-vinyl alcohol copolymer and solvent soluble copolyester, and (3) vinyl ester-alkyl maleate copolymer.

3 Claims, No Drawings

PRINTABLE RELEASE COATING COMPOSITION TAPES

BACKGROUND OF THE INVENTION

Adhesive tapes with printed indicia on the back side, i.e., the side opposite the side bearing adhesive are useful for advertising and identification functions. Those using printed tapes include relatively small businesses and professional people as well as large manufacturers. For such uses as a practical matter, the tape is a pressure-sensitive adhesive tape. Thus, printable pressure-sensitive adhesive tapes have wide commercial and industrial applications.

Inasmuch as pressure-sensitive adhesive tapes are those in which the adhesive has sufficient tack to adhere to adherand surfaces with light finger pressure, the tapes are generally coated on the back side with a release agent. A coating containing a release agent permits the tape to be unwound easily from its roll without transfer of the adhesive to the back side of the tape. Thus, in printable pressure-sensitive adhesive tapes, the ink must adhere to the release coating which is often also called a "backsize".

One of the first attempts to provide a printed pressure-sensitive adhesive tape was a process described as the "print seal process". In this process, the back side of the tape is printed with indicia, dried, and immediately overprinted with a release agent and dried before the adhesive surface contacts the printed indicia. Although this process produces a satisfactory tape when properly carried out, the process requires a special tape printing machine with at least two printing and drying operations, making it inconvenient, expensive and frequently variable in result when carried out by a relatively small user.

A number of attempts have been made to provide printable, pressure-sensitive adhesive tapes which do not require overprinting. Canadian Pat. No. 921,776 describes a backsize coating which is printable. However, the adhesives employed are low adhesion, crude rubber adhesives. Backsize described in the patent are not suitable or adequate for aggressive adhesives based on block copolymer elastomers. U.S. Pat. No. 3,967,031 describes a different release coating composition and use of the composition on tapes provides printable surfaces with good ink anchorage for pressure-sensitive adhesive tapes based on low adhesion, crude rubber. There is no teaching therein for a release coat suitable for high adhesion block copolymer based pressure-sensitive adhesives. U.S. Pat. No. 3,543,920 describes a tape with a printable release coat which permits winding and unwinding without offsetting of the ink after the tape has been printed but it also is directed to adhesives from low adhesion natural rubbers. Several U.S. Patents, e.g. Nos. 3,869,307; 4,056,661; and 4,138,528, describe pressure-sensitive adhesives with printable ink receptive surfaces but these tapes are not designed to be wound against their own backing after printing and therefore are not provided with release properties.

Block copolymer based pressure-sensitive adhesives, such as taught in U.S. Pat. No. 3,676,202 and 3,783,072, are high performance adhesives which are further advantageous in being extrudable or in requiring less solvent during manufacture, and therefore highly desirable. However, these adhesives have created new problems in connection with release and printability which known release coating compositions have not been able to overcome. It has been particularly difficult to find a release agent which sufficiently retains the printed indicia against the adhesive action of the high performance or high adhesion adhesives based on the block copolymer elastomers. Thus, it is desirable to provide a release coating composition which when employed with block copolymer based pressure-sensitive adhesive tapes will impart to the tapes the property of ready release and good printability without adversely affecting adhesion and tack. It is further desirable to provide a release coating composition which will form a coating which is resistant to splitting and to loss of desirable properties on aging.

DESCRIPTION OF THE INVENTION

According to the present invention there has been discovered a release coating composition having good release and good printability properties when employed with high adhesion pressure-sensitive adhesives based on A-B-A block copolymers as hereinafter defined.

The release compositions of the present invention comprises (1) from about 85 to 15 parts by weight of a vinylidene chloride-acrylonitrile copolymer, (2) correspondingly from about 15 to 85 parts by weight of a polymer selected from the group consisting of a vinyl chloride-vinyl acetate-vinyl alcohol terpolymer, a vinyl acetate-vinyl chloride copolymer, and a solvent soluble copolyester, and (3) for every 100 parts of the combination of (1) and (2) from about 17.5 to 55 parts by weight of a copolymer of a vinyl ester and an alkyl maleate wherein the alkyl group has a chain length of at least 16 carbon atoms, preferably at least 18 carbon atoms. The foregoing components in a suitable solvent form a release coating composition which when employed to make printed pressure-sensitive adhesive tapes, produce tapes which when wound into a roll in a conventional manner, exhibit properties of good release requiring only low unwind force (less than about 30 ounces), good ink retention with substantially no ink transfer to the adhesive, good adhesion, and good tack, and no backsize splitting. Further, the tapes retain these properties after aging.

The most suitable vinylidene chloride-acrylonitrile copolymers for use in the release coating compositions are ketone solvent soluble, flexible, film-forming copolymers available commercially under the tradename "Saran Resin" from The Dow Chemical Company. A particularly suitable copolymer is one identified as "Saran Resin F-310". However, other vinylidene chloride-acrylonitrile copolymers may be used. The acrylonitrile content desirably should be 15 percent or higher but not more than about 32 percent to avoid formation of a hard, brittle film.

The second component of the release coating composition is a polymer selected from the group consisting of a terpolymer of vinyl chloride, vinyl acetate and vinyl alcohol; a copolymer of vinyl acetate and vinyl alcohol; or a solvent-soluble copolyester.

The terpolymer vinyl chloride-vinyl acetate-vinyl alcohol is generally prepared by partial hydrolysis of a vinyl chloride-vinyl acetate copolymer and therefore sometimes known as "hydrolyzed vinyl chloride-vinyl acetate copolymer resin". The preferred polymers are generally in the molecular weight range of about 15,000 to 15,500. One suitable copolymer is available commercially as BAKELITE ® vinyl chloride-acetate resin VAGD from Union Carbide Corporation.

The vinyl acetate-vinyl alcohol copolymer is a medium molecular weight resin which has a vinyl alcohol content in the range of about 16 to about 19 percent by weight. A particularly suitable resin is available commercially as BAKELITE ® vinyl acetate-vinyl alcohol resin MA-28-18.

The copolyester suitable as a second component of the release composition is a ketone solvent soluble copolyester which consists essentially of one highly crystalline ester component and one substantially less crystalline ester component. One such copolyester is that polymerized from propylene glycol, glycerol, terephthalic acid and isophthalic acid. Other copolyesters include copolyesters of ethylene terephthalate and ethylene isophthalate; butylene terephthalate and butylene isophthalate; ethylene terephthalate and ethylene azelate; ethylene terephthalate and ethylene sebacate; ethylene terephthalate and butylene adipate; ethylene terephthalate and butylene terephthalate; etc. In the above copolyesters, the highly crystalline monomer component, i.e., ethylene terephthalate or butylene terephthalate, is the major constituent. In other words, the polymer from the less crystalline ester component represents less than 50 percent of the copolyester, preferably less than 40 percent.

The third essential component of the present composition is a copolymer of a vinyl ester and an alkyl maleate. In the copolymer there is from 1 to 5 moles of the vinyl ester for each mole of alkyl maleate. The vinyl ester is that of vinyl alcohol and a saturated carboxylic acid containing from 2 to 6 carbon atoms. The maleic ester is a partial alkyl ester derived from one-half to one-and-one-half moles of a $C_{16}$ to $C_{22}$ alkyl alcohol and one mole of maleic acid. The copolymer may be prepared by reacting maleic anhydride with higher alkyl alcohol to obtain an alkyl maleate, thereafter adding to the reaction mixture a vinyl alkanoate and refluxing to produce the copolymer of vinyl ester and alkyl maleate. The preparation and properties of the copolymers are described in U.S. Pat. No. 2,816,655.

The release composition is prepared by dissolving the component polymers in a suitable solvent at low solids concentration of about 3 to 8 percent, preferably about 5 percent. The solvents suitable include methyl ethyl ketone, acetone, cyclohexanone, diisobutylketone or other ketone type solvents. Aromatic hydrocarbons may be used in minor amounts as diluent; these include toluene, xylene, benzene and the like.

The composition is suitable for application to a film or film-coated backing or foil. Suitable films and foils include polyester film or aluminum foil and the like. A paper backing also may be employed. However, the paper must be coated prior to the application of the release composition. Suitable coatings for paper include vinylidene chloride-acrylonitrile, polyester, copolyester and the like.

In coating on the film, a low coating weight in the range of about 0.001 to about 0.005 ounce per square yard, preferably about 0.002 ounce per square yard is employed. The coating may be carried out by knife or bar coating, or other methods conventionally employed.

The adhesives for which the present printable release compositions are particularly effective are those based on block copolymer and tackifier resin. Known release compositions are ineffective or poorly effective in retaining the printed indicia from the stripping action of the A-B-A or A-B block copolymer based high adhesive pressure-sensitive adhesives, or in providing adequate release against these block copolymer based adhesives.

A suitable A-B-A block copolymer adhesive comprises (a) an elastomer component where a major (60 to 100 percent) proportion by weight of the total elastomer is an A-B-A or A-B block copolymer and from 40 to 0 percent of conventional elastomer, wherein in said A-B-A or A-B block copolymer, A is a thermoplastic polymer block of a vinylarene possessing a glass transition temperature above ambient temperature and B is an elastomeric polymer block of a conjugated diene such as isoprene, and in which block copolymer the thermoplastic A block constitutes about 8 to 35 percent by weight and has a molecular weight of at least about 7,000 and (b) a tackifier resin component in which the resin has a melting point of at least about 90° C. and may be of polymerized five- or six-carbon diene hydrocarbon with the major proportion being piperylene or isoprene, or a mixture of solid and liquid resins, said tackifier resin being present in an amount of from about 25 to about 125 parts by weight for 100 parts of total elastomers. The preparation and properties of the block copolymer adhesives are more fully described in U.S. Pat. Nos. 3,676,202 and 3,783,072.

The adhesive formulations are then coated onto the backing on the side opposite that coated with the release composition. The backing may be film, or of impregnated or coated crepe paper. The coated backing is dried and then fluxed. The backsize must be fluxed at at least about 250° F. This may be done after drying of the backsize or simultaneously with the drying of the adhesive. The maximum temperature for fluxing is about 300° F. for film such as polyester film and about 400° F. for treated paper. Thereafter the coated backing is slit into tapes and wound on mandrels. The tapes are readily unwound requiring low unwind force and without tearing of the backing, but have high adhesive properties even after aging either at ambient temperature or at elevated temperature.

Either prior to or after slitting, the tapes may be printed with the desired indicia. The ink most suitable for printing of the tapes are based primarily on polyamide polymers. Typical suitable inks are those available as Gotham Black Propalin Ink No. 19-579 and Gotham Red Propalin Ink No. 19-743. For application to tapes, the inks may be dissolved in a solvent mixture of propyl alcohol and propyl acetate and applied to the release coated backings with the desired indicia and dried before contacting the adhesive.

The printed film then may be slit into tapes of the desired width and rolled on a mandrel or if previously slit into tapes are then rewound on mandrels.

The printed tapes are readily unwound with low unwind force and on unwinding show no detectable transfer of the ink onto the adhesive. In addition, the tapes show good adhesion, good tack and no backsize splitting.

Release coated high-adhesion pressure-sensitive adhesive tapes and printed release coated high-adhesion pressure-sensitive adhesive tapes constitute aspects of the present invention.

The following examples illustrate the invention but are not to be construed as limiting.

EXAMPLE I

Release compositions (Compositions 1, 2 and 3) and comparative compositions (Compositions A, B and C)

containing components as set forth in Table A are prepared by mixing the components in methyl ethyl ketone. The compositions are applied to a 1 mil polyester film with a No. 5 Meier rod, and the coated film dried and fluxed at a temperature of 250° F. to provide a backsize coated film with a backsize weight of about 0.002 ounces per square yard. The opposite surface is then coated with an adhesive of the following components:

|  | Parts by Weight |
|---|---|
| Kraton ® 1107 | 100 |
| Wingtack ® 95 | 80 |
| 2,5-Ditertiary-amylhydroquinone | 0.5 |
| Zinc dibutyl dithiocarbamate | 1 | applied from a 50 percent solids in toluene. The coated film is then dried and fluxed by passing through an oven with a temperature gradient of from about 180° F. to about 280° F. obtain an adhesive coated film of adhesive coating weight of about 1 ounce per square yard.

The adhesive and backsize coated film then is slit into tapes about 2 inches wide. The tapes are printed with a standard printing logo using Gotham Black Propalin Ink No. 19-579. The printed tapes are wound into rolls and retained for seven days at room temperature or seven days at 120° F. (The aging at elevated temperature is an accelerated aging test.) The tapes are measured for adhesion, tack, and unwind force, and observed for ink transfer. The results are seen in Table B in which the tapes are identified with the release coating composition of Table A used in forming the backsize. The table also gives results of observations on backsize splitting of the tapes.

The tapes prepared employing Backsize Compositions 1, 2 and 3 exhibit useful combination of properties in adhesion, tack, unwind, ink transfer and no backsize splitting. Tapes prepared employing Compositions A, B and C have one or more defective properties: high unwind (Composition C; also A at elevated temperatures) and Backsize splitting (Compositions A and B). (Adhesion, tack and unwind determinations were not carried out at elevated temperatures in Composition C in view of the very high unwind exhibited at room temperature.)

KRATON ® 1107 is an A-B-A block copolymer (polystyrene-polyisoprene-polystyrene) having a polystyrene content of 12-15 percent and a number average molecular weight of about 110,000-125,000 and is available from Shell Chemical Company.

WINGTACK ® 95 is a solid tackifier resin of polymerized mixed olefins, predominantly piperylene and isoprene, having a softening point of 95° C. and is available from Goodyear Chemical Company.

Gelva C-254 is a vinyl stearate-maleic anhydride copolymer obtained from Monsanto Company as a solution in heptane at 35 percent solids and having a viscosity of approximately 500 centipoises.

Saran 310 is a vinylidene chloride-acrylonitrile copolymer available from The Dow Chemical Company. This polymer has a viscosity at 2 percent solids in dimethylformamide of 2.0 to 2.37 centipoises. The nitrogen content of the copolymer is from 5.0 to 5.5 percent.

BAKELITE ® MA 28-18 is a vinyl acetate-vinyl alcohol copolymer with a monomer weight ratio of about 82:18 available from Union Carbide Corporation. It is supplied at 28 percent solids in a methyl acetate-methanol solvent mixture. The solution viscosity mea-

TABLE A

| COMPONENTS | BACKSIZE COMPOSITION (Parts By Weight) Examples | | | | | |
|---|---|---|---|---|---|---|
|  | 1 | 2 | 3 | A | B | C |
| (1) Vinylidene chloride-acrylonitrile polymer[1] | 5 | 5 | 8 | 10 | 10 | 10 |
| (2) Vinyl chloride-vinyl acetate-vinyl alcohol terpolymer[2] | 5 | — | — | — | — | — |
| Vinyl acetate-vinyl alcohol copolymer[3] | — | 5 | — | — | — | — |
| Copolyester polymerized from propylene glycol, glycerol terephthalic acid and isophthalic acid[4] | — | — | 2 | — | — | — |
| (3) Vinyl stearate-maleic anhydride copolymer[5] | 2.5 | 2.5 | 2.5 | 1 | 3.33 | — |
| (4) Methyl ethyl ketone (solvent) | 237.5 | 237.5 | 237.5 | 209 | 253 | 190 |
| Percent Solids | 5 | 5 | 5 | 5 | 5 | 5 |

[1]Saran F-310
[2]VAGD
[3]Bakelite ® MA 28-18
[4]Vitel 307
[5]Gelva C-254

TABLE B

| TAPES | PROPERTIES | | | | | | | | | |
|---|---|---|---|---|---|---|---|---|---|---|
|  | Adhesion (ounces) | | Tack | | Unwind (ounces) | | Ink Transfer | | Backsize Splitting | |
| Backsize Composition | RT* | 120° F. | RT | 120° F. | RT | 120° F. | RT | 120° F. | RT | 120° F. |
| 1 | 60-63 | 55-59 | 2.8-3.3 | 2.8-3.1 | 21-32 | 31-35 | 0 | 0 | No | No |
| 2 | 62-65 | 59-66 | 3.6-4.0 | 4.0-4.0 | 16-27 | 21-25 | 0 | 0 | No | No |
| 3 | 55-60 | 59-62 | 2.7-3.0 | 2.8-3.1 | 25-27 | 29-39 | 0 | 0 | No | No |
| A | 60-66 | 52-59 | 2.8-3.1 | 2.8-3.8 | 28-45 | 66-100 | 0 | 0 | No | Yes |
| B | 60-65 | 59-63 | 3.8-4.0 | 3.3-4.0 | 13-21 | 17-30 | 0 | 0 | Yes | Yes |
| C | 47-57 | — | 1.8-2.5 | — | 64-80 | — | 0 | 0 | No | No |

*Room Temperature sured with Brookfield No. 4 spindle at 20° C. is 400 to 800 centipoises.

VAGD is a vinyl chloride-vinyl acetate-vinyl alcohol terpolymer with a complete trade name of BAKELITE® Vinyl Chloride-Acetate Resin VAGD and is obtained from Union Carbide Corporation. The polymer has a molecular weight of approximately 15,000. The polymer composition is such that the vinyl chloride to the vinyl acetate-vinyl alcohol ratio is approximately 90:4 with a hydroxyl content of about 2.3 percent. The inherent viscosity (ASTM D-1243) is approximately 0.44.

Vitel 307 is a product of Goodyear Chemical Company. It is a flexible mixed copolyester believed to be a polymer of propylene glycol, glycerol terephthalic acid and isophthalic acid. It has a specific gravity of 1.21, an intrinsic viscosity of 0.77, and a ring and ball softening point of 128° C.

Adhesion is measured by the standard test method PSTC-1 of the Pressure-Sensitive Tape Council.

Tack is measured by a Quick Stick test as follows.

A strip of tape is laid on a horizontal surface with adhesive side up and a hollow plastic ball rolled down an incline onto the tape. The vertical height from which the ball started is noted and the distance the ball rolls along the tape before coming to rest is measured. The Quick Stick is reported as the height in inches raised to the 3/2 power divided by the distance the ball rolls on the tape. This ratio is found to be constant for a given tape. The test ball is a 1.5 inch-diameter, 1.916 gram-nitrocellulose ball which is cleaned with petroleum ether and dried before use.

Unwind is measured by placing the roll of tape on a freely rotating mandrel, then rewinding the tape onto another spool at a rate of 50 feet per minute measuring the force exerted on the freely rotating mandrel as the tape is stripped from the roll. The unwind force is reported as ounces per inch of tape width.

EXAMPLE II

A tape is prepared in a manner described in Example I using the components of Composition 1 of Example I except that the ratio of the vinylidene chloride-acrylonitrile polymer to the vinyl chloride-vinyl acetate-vinyl alcohol terpolymer is changed to 8:2. The tape has excellent release properties and shows only a trace of ink transfer after being printed with the Black Propalin Ink and aged seven days at 120° F. It further exhibits excellent adhesion and tack and no backsize splitting.

EXAMPLE III

A latex impregnated crepe paper suitable for pressure-sensitive tapes is coated on the back side with approximately 0.25 ounce per square yard (dry weight) of a vinylidene chloride-acrylonitrile (Saran F-310) solution to provide a smooth surface on which to apply a printable release coating composition. Over the Saran coating is applied approximately 0.002 ounce per square yard (dry weight) of release coating Composition 1 of Example I, dried and fluxed at 280° F. The other surface of the impregnated paper is coated with about 1.5 ounces per square yard (dry weight) of the adhesive of Example I and dried. The tape has excellent release, is printable with Red Propalin ink and shows no observable ink transfer.

EXAMPLE IV

Example III is repeated except that the vinylidene chloride-acrylonitrile coating is replaced with copolyester Vitel 307 prior to coating with the release composition. The coating weights employed are the same as used in Example I. The tape has good release properties, is printable with Black Propalin ink and shows no ink transfer.

I claim:

1. A printable high-adhesion pressure-sensitive adhesive tape comprising a backing film or foil which is coated on one side with a high-adhesion pressure-sensitive adhesive of an elastomer and tackifier resin wherein in said adhesive, the major portion of the elastomer is of an A-B-A or A-B block copolymer wherein A is a thermoplastic polymer block derived from a vinylarene and B is an elastomeric polymer block derived from a conjugated diene and which is coated on the other side with a release coating comprising
   (1) from about 85 to 15 parts by weight of a vinylidene chloride-acrylonitrile copolymer,
   (2) correspondingly from about 15 to 85 parts by weight a polymer selected from the group consisting of a vinyl chloride-vintl acetate-vinyl alcohol terpolymer, a vinyl acetate-vinyl alcohol copolymer, and a solvent-soluble copolyester, and
   (3) for every 100 parts of (1) and (2), from about 17.5 to 55 parts by weight of a copolymer of vinyl ester and alkyl maleate wherein the alkyl group has a chain length of at least about 16 carbon atoms,
   said release coating being ink-imprintable and low-force removable from said high-adhesion pressure-sensitive adhesive.

2. A printed high-adhesion pressure-sensitive adhesive tape comprising a backing film or foil which is coated on one side with a high-adhesion pressure-sensitive adhesive of an elastomer and tackifier resin wherein in said adhesive, the major portion of the elastomer is of an A-B-A or A-B block copolymer wherein A is a thermoplastic polymer block derived from a conjugated diene and which is coated on the other side with a release coating comprising
   (1) from about 85 to 15 parts by weight of a vinylidene chloride-acrylonitrile copolymer,
   (2) correspondingly from about 15 to 85 parts by weight a polymer selected from the group consisting of a vinyl chloride-vinyl acetate-vinyl alcohol terpolymer, a vinyl acetate-vinyl alcohol copolymer, and a solvent-soluble copolyester, and
   (3) for every 100 parts of the combination of (1) and (2), from about 17.5 to 55 parts by weight of a copolymer of vinyl ester and alkyl maleate wherein the alkyl group has a chain length of at least about 16 carbon atoms,
   and wherein said release coating bears an inked impression, and is low-force removable from said high-adhesion pressure-sensitive adhesive without transfer of the inked impression to said high-adhesion pressure-sensitive adhesive.

3. A printable high-adhesion pressure-sensitive adhesive tape comprising a polyester backing film which is coated on one side with a high-adhesion pressure-sensitive adhesive of an elastomer and tackifier resin wherein in said adhesive, the elastomer is of an A-B-A or A-B block copolymer wherein A is a thermoplastic polymer block derived from a vinylarene and B is an elastomeric polymer block derived from isoprene and which is coated on the other side with a release coating comprising
 (1) from about 85 to 15 parts by weight of a vinylidene chloride-acrylonitrile copolymer,
 (2) correspondingly from about 15 to 85 parts by weight a polymer selected from the group consisting of a vinyl chloride-vinyl acetate-vinyl alcohol terpolymer, a vinyl acetate-vinyl alcohol copolymer, and a solvent-soluble copolyester, and
 (3) for every 100 parts of (1) and (2), from about 17.5 to 55 parts by weight of a copolymer of vinyl ester and alkyl maleate wherein the alkyl group has a chain length of at least about 16 carbon atoms,
said release coating being ink-imprintable and low-force removable from said high-adhesion pressure-sensitive adhesive.

* * * * *